No. 872,786. PATENTED DEC. 3, 1907.
E. H. BEAZELL.
PISTON.
APPLICATION FILED MAR. 20, 1907.
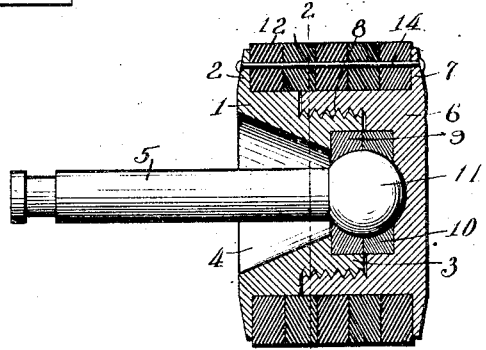
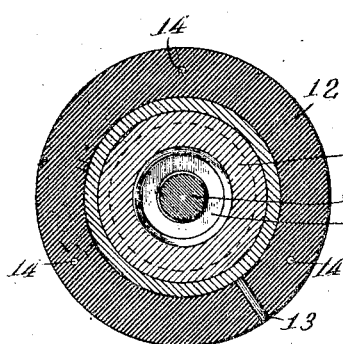
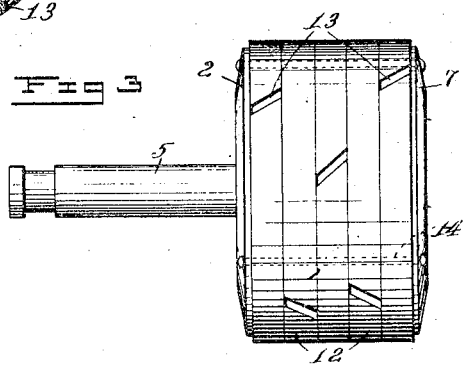
Witnesses
H. A. Robinette
L. A. Hawley
Inventor
Edwin H. Beazell
By
G. Urso
Attorney

UNITED STATES PATENT OFFICE.

EDWIN H. BEAZELL, OF CANONSBURG, PENNSYLVANIA.

PISTON.

No. 872,786.

Specification of Letters Patent.

Patented Dec. 3, 1907.

Application filed March 20, 1907. Serial No. 363,374.

*To all whom it may concern:*

Be it known that I, EDWIN H. BEAZELL, a citizen of the United States, residing at Canonsburg, in the county of Washington and State of Pennsylvania, have invented certain new and useful Improvements in Pistons, of which the following is a specification.

My invention relates to improvements in pistons, and it consists in the constructions, combinations and arrangements herein described and claimed.

The object of my invention is to provide a durable and inexpensive form of piston operating with a minimum of friction, and in which the wear and leakage occurring in the use of existing types of pistons will be eliminated.

In the accompanying drawings, forming a part of this application, and in which similar reference symbols indicate corresponding parts in the several views, Figure 1 is a sectional view, illustrating one embodiment of my invention adapted for the trunk piston of an air drill; Fig. 2 is a sectional view on the line 2—2 of Fig. 1; and Fig. 3 is a side elevation of the construction shown in Fig. 1.

Referring to the drawings, I have shown a piston head comprising a cylindrical member 1 provided with a peripheral flange 2 on its outer end, and having a threaded boss 3 extending concentrically from its inner end; said member being provided with a conical bore 4 for permitting the swing of a piston rod 5.

A cylindrical member 6, having a peripheral flange 7 on its outer end, is provided with a threaded bore 8 on its inner end for receiving the threaded boss 3; the boss and bore constituting threaded telescoping portions for screwing together said cylindrical members with a continuous peripheral seat between their flanges for packing rings.

The inner ends of the two cylindrical members are provided with registering recesses for receiving plates 9 and 10 which are formed to constitute a bearing for the spherical head 11 of the piston rod 5. As shown especially in Fig. 1, the bearing plates 9 and 10 are securely clamped in position between the members 1 and 6 when the latter are screwed together. The bearing plates, which receive all wear of the piston rod, are preferably formed of tempered, or hardened, steel; thereby permitting the cylindrical members 1 and 6 to be formed of malleable castings, or soft steel. I have shown the bearing plates of annular form, but they could be constructed with an irregular, or polygonal, periphery for positively locking them against turning in their recesses.

A series of split packing rings 12 are clamped together between the peripheral flanges of the cylindrical members 1 and 6, when the latter are screwed together. The packing rings are formed of a fiber composition, such as is supplied to the trade in the form of sheets or boards. I preferably construct the split rings with a width of approximately one-fourth inch; a suitable space 13 being shown between the ends of each ring to compensate for expansion and prevent injury to the ring ends through the action of moisture and other conditions occurring in practice. After the packing rings have been securely clamped in position by tightly screwing together the two cylindrical members 1 and 6, a series of rivets 14 are inserted through said series of rings and the clamping flanges 2 and 7. This construction insures great permanency and durability, in that the rivets rigidly secure the packing rings on the periphery of the cylindrical members and also positively lock said members against accidentally becoming unscrewed. It will be obvious that bolts, or other retaining means, could be substituted for the rivets 14, but rivets have proven in practice to be a very advantageous construction.

From the above described construction, it will be seen that my invention provides a very durable construction, in which the several parts are securely locked against displacement. My invention has proven especially advantageous in pneumatic devices, such as air drills and compressors; the fiber packing rings maintaining a fluid tight fit within the cylinder with slight friction, and a minimum of resulting wear and deterioration.

The scoring and injury caused by hard metal packing rings in cast iron cylinders necessitates continuous adjustment of the packing rings and frequent reborings of the cylinder. Attempts have been made to overcome these defects by the employment of soft metal packing rings, but the distortion of such rings and their rapid local wear in use has rendered such constructions impracticable under many conditions.

I have illustrated and described a preferred and satisfactory construction, but, obviously, changes could be made within the spirit and scope of my invention.

Having thus described my invention, what I claim as new therein and desire to secure by Letters Patent is:

1. A piston comprising cylindrical members provided with peripheral flanges and with recesses for bearing plates, packing rings on the peripheries of said members, bearing plates in said recesses, and means for securing said members together for clamping the packing rings between said flanges and clamping said bearing plates in their recesses, substantially as described.

2. A piston comprising cylindrical members provided with peripheral flanges and with recesses for bearing plates, a series of split fiber packing-rings on the peripheries of said members, bearing plates in said recesses, means for securing said members together for clamping the series of rings between said flanges and simultaneously clamping said bearing plates in their recesses, and a common means for securing said packing rings in position and positively locking said cylindrical members in their secured position, substantially as described.

3. A piston comprising cylindrical members provided with peripheral flanges, a series of split fiber packing-rings on the peripheries of said members, screw-threaded engaging portions on said members for securing them together and provided with recesses, bearing plates in said recesses and a common means for securing said packing rings in position and positively locking said members against accidentally unscrewing, substantially as described.

In testimony whereof I affix my signature in presence of two witnesses.

EDWIN H. BEAZELL.

Witnesses:
 J. A. A. CRAIG,
 E. G. C. CLOSE.